(12) United States Patent
Tzeng et al.

(10) Patent No.: US 9,333,489 B2
(45) Date of Patent: May 10, 2016

(54) CONFINED CELL STRUCTURE AND METHOD OF MAKING THE SAME

(71) Applicant: ATOMIC ENERGY COUNCIL—INSTITUTE OF NUCLEAR ENERGY RESEARCH, Taoyuan County (TW)

(72) Inventors: Yi-Ren Tzeng, Taoyuan County (TW); Cheng-Si Tsao, Taoyuan County (TW)

(73) Assignee: Atomic Energy Council—Institute of Nuclear Energy Research, Taoyuan County (TW)

(*) Notice: Subject to any disclaimer, the term of this patent is extended or adjusted under 35 U.S.C. 154(b) by 65 days.

(21) Appl. No.: 14/094,997

(22) Filed: Dec. 3, 2013

(65) Prior Publication Data
US 2015/0151277 A1 Jun. 4, 2015

(51) Int. Cl.
*B01J 23/42* (2006.01)
*B01J 35/10* (2006.01)
*B01J 37/06* (2006.01)
*B01J 37/12* (2006.01)
*B01J 21/18* (2006.01)
*B01J 29/06* (2006.01)
*B01J 35/00* (2006.01)
*B01J 37/02* (2006.01)

(52) U.S. Cl.
CPC ............... *B01J 23/42* (2013.01); *B01J 35/006* (2013.01); *B01J 35/10* (2013.01); *B01J 35/1061* (2013.01); *B01J 21/18* (2013.01); *B01J 29/061* (2013.01); *B01J 35/0013* (2013.01); *B01J 35/108* (2013.01); *B01J 35/1028* (2013.01); *B01J 35/1042* (2013.01); *B01J 37/0203* (2013.01); *B01J 37/0207* (2013.01); *B01J 37/0211* (2013.01); *B01J 37/06* (2013.01); *B01J 37/12* (2013.01)

(58) Field of Classification Search
CPC ............ B01J 21/08; B01J 21/18; B01J 23/00; B01J 35/00; B01J 35/006; B01J 35/0073; B01J 35/04
USPC ........................................... 502/87, 182, 240
See application file for complete search history.

(56) References Cited

U.S. PATENT DOCUMENTS

| | | | |
|---|---|---|---|
| 7,288,502 B2* | 10/2007 | Okanobori et al. | 502/185 |
| 8,648,004 B2* | 2/2014 | Kuo et al. | 502/184 |
| 2010/0104926 A1* | 4/2010 | Baret et al. | 429/44 |

OTHER PUBLICATIONS

"Pt nanoparticles supported on mesoporous carbon nanocomposites incorporated with Ni or Co nanoparticles for fuel cells," Fabing Su et al. Journal of Power Sources 205 (2012), pp. 136-144.*
"Palladium Nanoparticles Confined in the Cages of MIL-101: An Efficient Catalyst for the One-Pot Indole Synthesis in Water," Hui Li et al. ACS Catalysis 2011, 1, pp. 1604-1612.*
"Yolk-Shell Hybrid Materials with a Periodic Mesoporous Organosilica Shell: Ideal Nanoreactors for Selective Alcohol Oxidation," Jian Liu et al. Advanced Functional Materials 2012, 22, pp. 591-599.*

(Continued)

*Primary Examiner* — Patricia L Hailey
(74) *Attorney, Agent, or Firm* — Rosenberg, Klein & Lee (57) ABSTRACT

The present invention discloses a confined cell structure with the entires guarded by nano-scale metal nano-particles to help confine subnano-sized metal nano-particles inside the cell. Also the present invention provides a method of forming said confined cell structure on mesoporous carbon materials using a simple impregnation process.

10 Claims, 9 Drawing Sheets

(56) References Cited

OTHER PUBLICATIONS

"Entrapment of metal nanoparticles within nanocages of mesoporous silicas aided by co-surfactants," Xiaobo Li et al. Journal of Materials Chemistry 2012,22, pp. 21045-21050.*

"Intercalation of Aggregation-Free and Well-Dispersed Gold Nanoparticles into the Walls of Mesoporous Silica as a Robust "Green" Catalyst for n-Alkane Oxidation," Lifang Chen et al. J. Am. Chem. Soc. 2009, 131, pp. 914-915.*

"Highly dispersed encapsulated AuPd nanoparticles on ordered mesoporous carbons for the direct synthesis of H2O2 from molecular oxygen and hydrogen," Tomas Garcia et al. Chem. Commun., 2012, 48, pp. 5316-5318.*

"Controlled reduction of palladium nanoparticles on surface of chemically modified silicas," N. Ivashchenko et al. Mat.-wiss.u. Werkstofftech, 2011, 42, pp. 64-69.*

"In situ encapsulation of Au nanoparticles in mesoporous core-shell TiO2 microspheres with enhanced activity and durability," Zhanfeng Bian et al. Chem. Commun., 2009, pp. 3789-3791.*

"Entrapment of Metal Nanoparticles in Polymer Stomatocytes," Daniela A. Wilson et al. Journal of the American Chemical Society 2012, 134, pp. 9894-9897.*

Hsiu-Chu Wu; Chih-Ching Chang; Hui-Ping Tseng; Kang-Ning Lee; Cheng-Hsiang Tung; Cheng-Si Tsao; Ming-Sheng Yu; Woei Wu Pai; Yi-Ren Tzeng; Volumetric Distribution of Pt Nanoparticles Supported on Mesoporous Carbon Substrates Studied by X-ray Photoelectron Spectroscopy Depth Profiling; SciVerse ScienceDirect; Carbon 54 (2013) pp. 389-395.

* cited by examiner

| | specific surface area (m²/g) | micropore volume (cm³/g) | total pore volume (cm³/g) | diameter of the mesopore channels (nm) | size of the platinum nano-particles (nm) |
|---|---|---|---|---|---|
| 1st embodiment | 1886 | 0.275 | 0.976 | 3.07 | ~2.5 |
| 2nd embodiment | 900 | 0.234 | 0.567 | 4.99 | ~5.2 |

CONFINED CELL STRUCTURE AND METHOD OF MAKING THE SAME

BACKGROUND OF THE INVENTION

1. Field of the Invention

The present invention relates to a confined cell structure, and more particularly, to a cell structure with multiple entries guarded by nano-scale metal nano-particles, which help confine subnano-scale metal nano-particles inside the cell, and a method of making the same.

2. Description of the Related Art

Metal nano-particles supported on porous materials have been used extensively in industry. Of particular interest is making highly dispersed metal nano-particles not only to reduce the amount of expensive metal, but also to enhance their reactivity. High dispersion means a large fraction of the metal atoms are located on the particle's surfaces, or at the interface of the support. By being under-coordinated, the surface-, or more specifically the step- and the corner-atoms, are more reactive than the bulk ones.

In the case of subnano-sized particles, where almost every atom or at least one of its closest neighbors is bound to the support through strong metal-support interactions, the chemical nature of the metal particle is strongly dependent on the property of the support. For porous carbon materials, carbon atoms have the unique ability to form chemical bonding states with varied hybridization of 2s and 2p atomic orbitals giving rise to bifunctional catalytic behavior near the junction of the metal-carbon interface. This makes nano-porous carbon materials an ideal support for extremely small metal particles, allowing them to retain or even augment their catalytic activity under catalytic reaction conditions.

However, due to the low stability of the subnano-sized metal particles, their practical use remains difficult. In order to increase the stability, one common method is to form oxygen-containing functional groups on the carbon surface. These oxygen functional groups act as the anchoring sites for the deposited metal particles making the diffusion difficult and thus hindering the ripening process.

Beside reducing the particle size, another method to enhance the reactivity of catalysts is to encapsulate metal nano-particles inside a confined nano-space. This increases the frequency of collisions between the reactants and energetics products enabling the reactions to proceed via some higher energy barrier pathways, which are otherwise inaccessible in an open system, to form products with a global minimum energy state.

To form a confined nano-reactor, Correa-Duarte and co-workers had disclosed in the *Angew Chem-Int Edit* 51, 3877 (2012) a template method consisting of four steps. The first step is to form spherical templates, made of polystyrene. The second one is to form metal nano-particles on the spherical template. The third one is another deposition procedure to form a layer of porous silicon oxide on the surfaces of the metal-decorated spheres. The last step is to remove the template to create a hollow-sphere with the interior surface decorated with metal nano-particles. Besides the complexity of the procedures, the main disadvantage of above-mentioned template method is the significant modification and the partial, or complete, removal of the metal nano-particles in the template removing process. This inevitable metal removing process significantly modifies the physical and chemical properties of the subnano-sized metal nano-particles making their survival difficult and uncertain. Here we provide a simple method to form a new confined cell structure that consists of multiple entries guarded by nano-scale metal nano-particles, which help confine subnano-sized metal nano-particles inside the cell.

SUMMARY OF THE INVENTION

The present invention provides a special spatial distribution of metal nano-particles on porous materials to form a confined cell structure and a method of making the same. The confined cell structure consists of a cell and a plurality of entries with a maximum diameter of about 3±20% nm. Those entries are guarded by nano-scale metal nano-particles with a thickness larger than 1 nm, which help confine a plurality of subnano-sized metal nano-particles with a size less than 1 nm in diameter inside the cell.

The forming method comprises the following steps:
1) providing a mesoporous body containing a plurality of macropore, each of which has a minimum diameter of 50 nm and communicates to a plurality of interconnected first-type mesopore channels. Each of those first-type mesopore channels further communicates to a plurality of the second-type mesopore channels, each of which has a diameter not larger than 3±20% nm. All of those macropore and the first- and second-type mesopore channels are connected to at least one micropore that has a diameter not larger than 2 nm;
2) oxidizing the mesoporous body to form oxygen-containing functional group on the surfaces of the first- and second-type mesopore channels;
3) forming a layer of metal precursor ions on the oxidized surfaces of the first- and second-type mesopore channels to reduce the maximum width of the entry of the second-type mesopore channels to be less than 1 nm making the passage of metal precursor ions from the first- to the second-type mesopore channels difficult such that the metal precursor concentrations inside the second-type mesopore channels are much lower than those outside.
4) reducing the metal precursor ions to metal nano-particles to form a plurality of metal subnano-sized metal nano-particles inside the second-type mesopore channels, a layer of metal nano-particles with a thickness larger than 1 nm at the entry of the second-type mesopore channels, and a plurality of metal nano-particles with a size larger than 2 nm outside the second-type mesopore channels

DETAILED DESCRIPTION OF THE PREFERRED EMBODIMENTS

Figure 1:
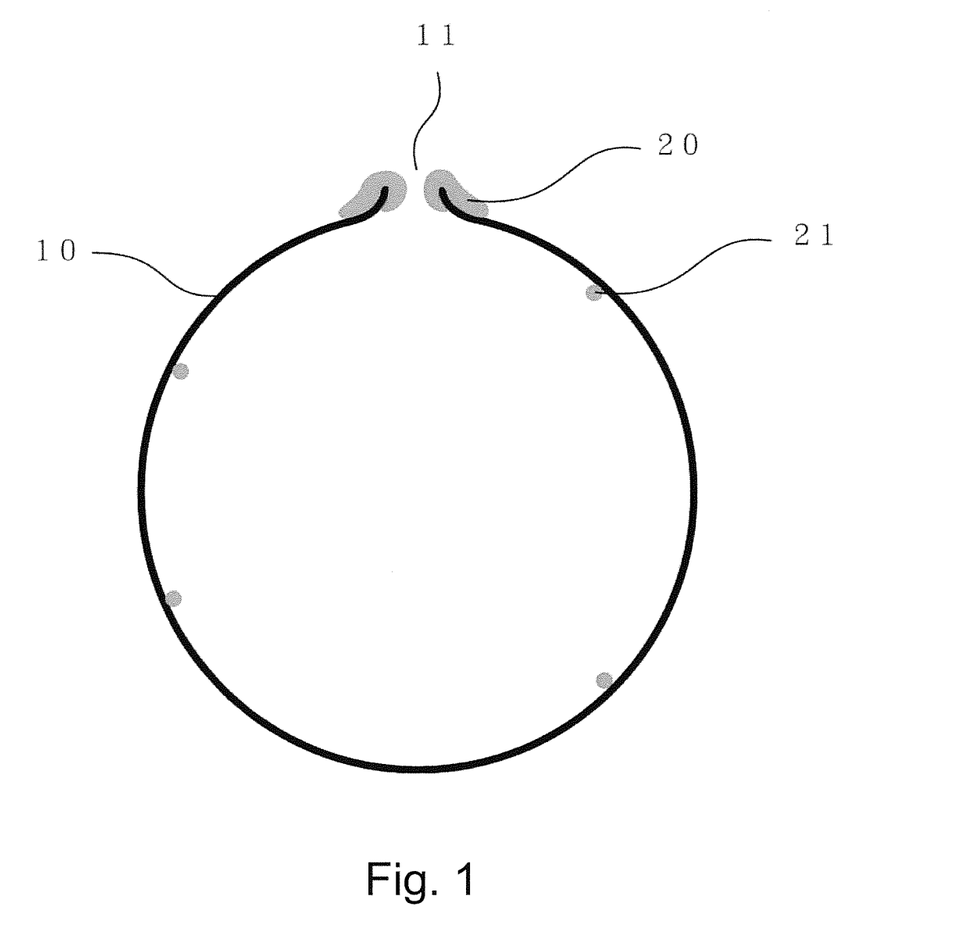
FIG. 1 shows a schematic drawing of the present invention.

Please refer to FIG. 1, which shows a confined cell structure consisting of at least a porous cavity 10, a plurality of cavity entries 11 with a maximum diameter of about 3±20% nm, a plurality of metal nano-particles 20 with a thickness larger than 1 nm at each cavity entry 11 to reduce the maximum width of the cavity entries 11 to be less than 1 nm, and a plurality of subnano-sized metal nano-particles 21 formed inside the porous cavity 10.

Figure 2:
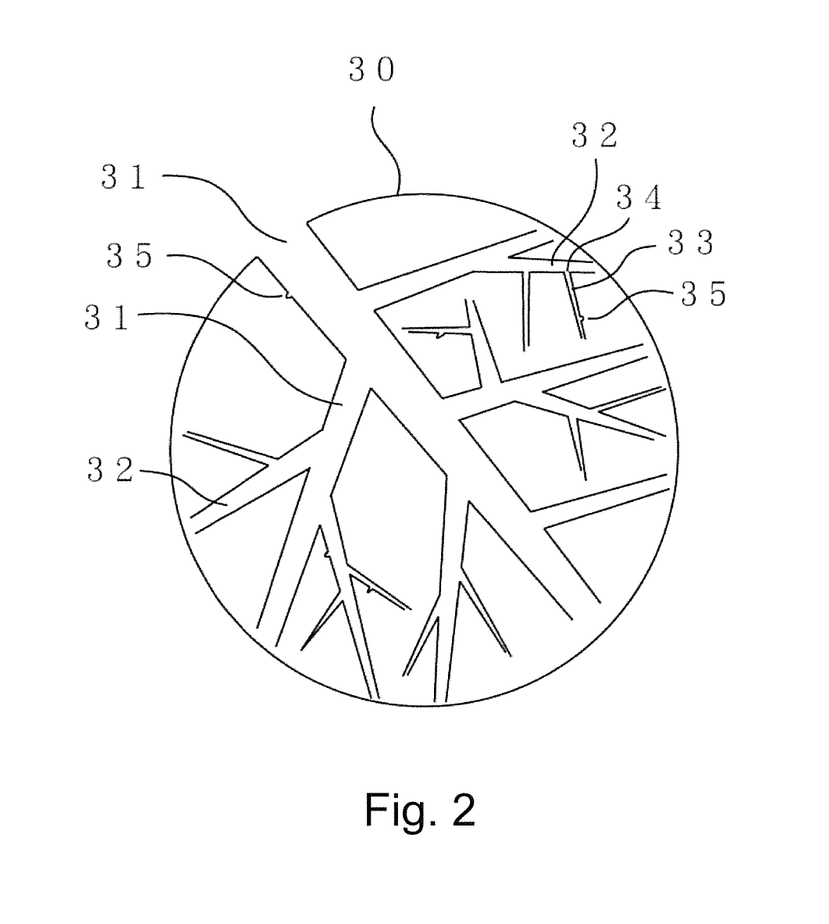
FIG. 2 shows a schematic drawing of the pore structure of the mesoporous body in the first preferred embodiment of the present invention.

The method of making the confined cell structure comprises the following steps. Step 1: as shown in FIG. 2, prepare a mesoporous body 30, which can be made of porous carbon materials, or zeolites, or porous silicates with a similar structure. The mesoporous body 30 consists of a plurality of macropores 31 with a minimum diameter of 50 nm. Each macropore further communicates with a plurality of interconnected first-type mesoporous channels 32 with a minimum diameter of 20 nm. Each of the first-type mesoporous channels 32 again communicates with a plurality of the second-type mesopore channels 33 with a maximum diameter of about 3±20% nm. The intersection of the first-type mesopore channel 32 and the second-type mesopore channel 33 is designated as the second-type mesopore channel entry 34. All of the macropores 31, the first-type mesopore channels 32 and the second-type mesopore channels 33 are connected to a plurality of micropores 35 with a maximum diameter of 2 nm. Step 2: oxidize the mesoporous body 30 to form oxygen-containing functional groups on the surfaces of the first-type mesopore channels 32 and the second-type mesopore channels 33.

Figure 3:
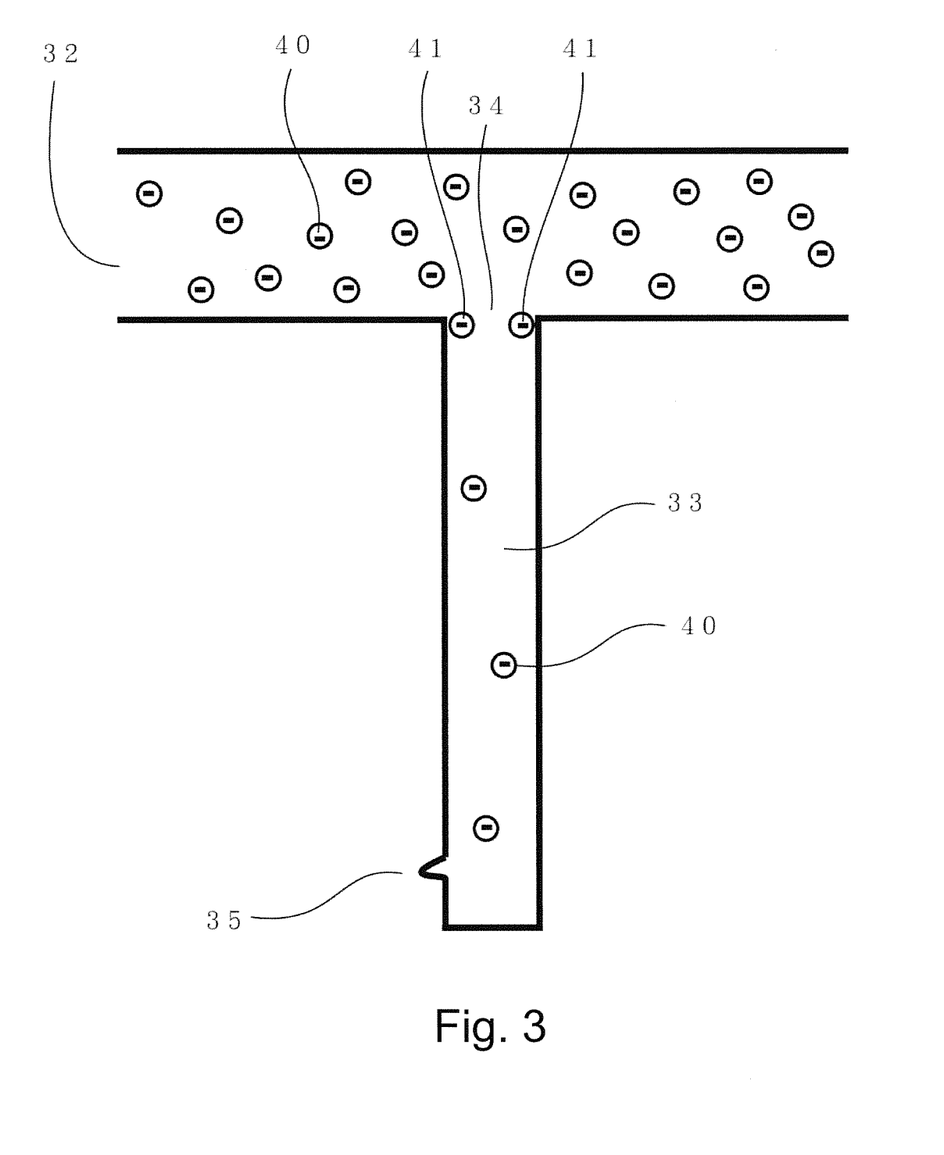
FIG. 3 shows a schematic drawing of the metal precursor ions adsorbed at the entry of a second-type mesoporous channel in the first preferred embodiment of the present invention.

Step 3: as shown in FIG. 3, which is an enlarged view of FIG. 2, evenly distribute a plurality of metal precursor ions 40 in the first-type mesopore channel 32 via an impregnation method to form a layer of metal precursor ions 41 at the entry 34 of the second-type mesopore channel 33 to reduce the maximum width of the entry 34 to be less than 1 nm. The size of the metal precursor ions is 1±30% nm. This makes the passage of metal precursor ions 40 from the first-type mesopore channels 32 to the second-type mesopore channels 33 difficult such that the metal precursor concentrations inside the second-type mesopore channels 33 is much lower than that outside.

Figure 4:
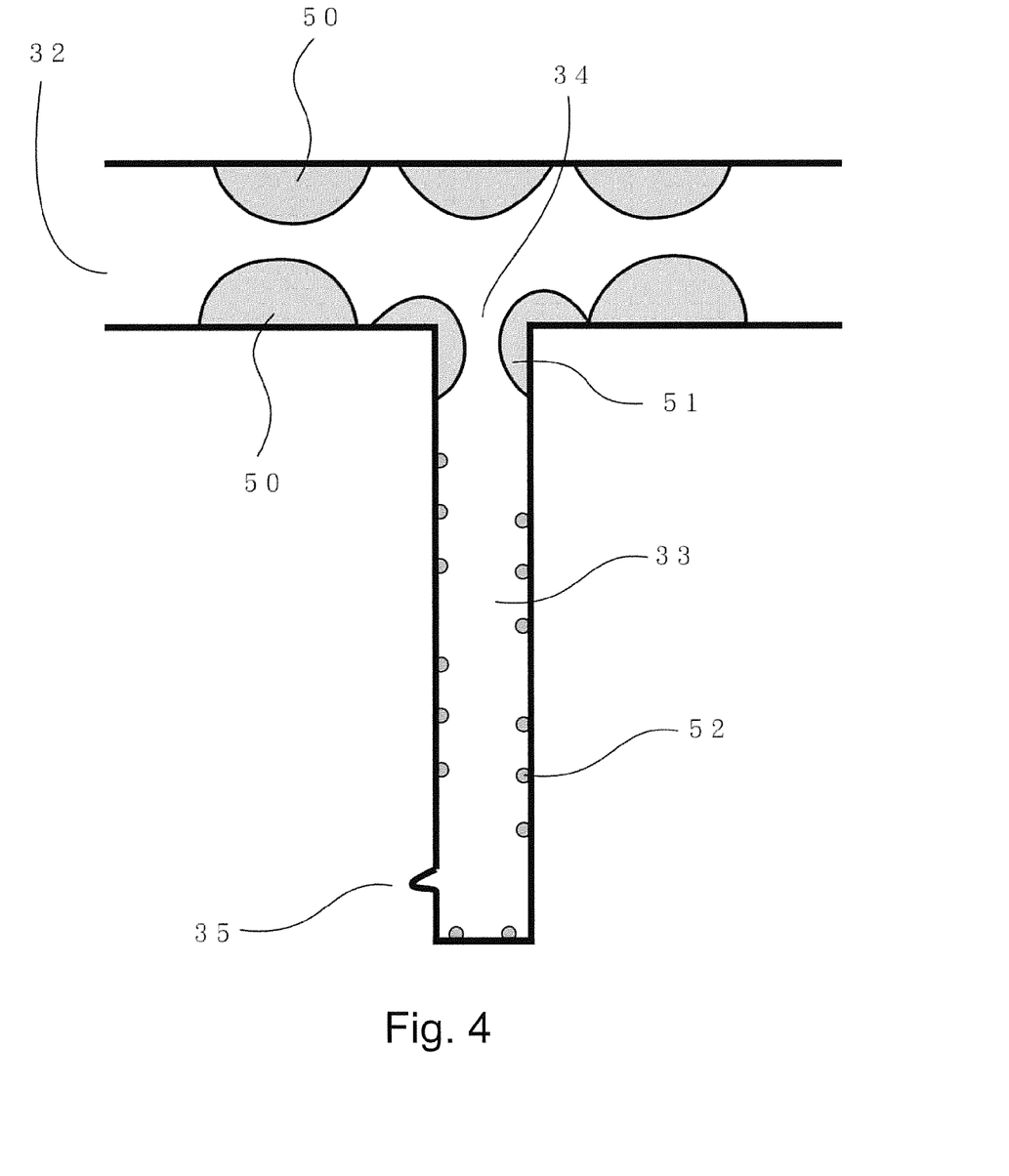
FIG. 4 shows a schematic drawing of the spatial distribution of metal nano-particles of different sizes in the first- and second-type mesopore channels in the first preferred embodiment of the present invention.

Step 4: as shown in FIG. 4, reduce the distributed metal precursor ions 40 and the adsorbed metal precursor ions 41 to form a plurality of metal nano-particles 50 with a size in the range of 2-5 nm in the first-type mesopore channel 32, a layer of metal nano-particles 51 with a thickness of larger than 1 nm at the entry 34 of the second-type mesopore channel 33, and a plurality of subnano-sized metal nano-particles 52 with the maximum size no larger than 1 nm inside the second-type mesopore channel 33.

The main principle of forming the confined cell structure using the impregnation method, as illustrated in FIG. 3 and FIG. 4, is to form a layer of metal precursor ions 41, which has a size of ~1 nm, at the entry 34 of the second-type mesopore channel 33 which has a width of ~3 nm. This reduces the effect diameter of the entry 34 to be ~1 nm making further passage of metal precursor ions 40, if possible, difficult. With only a limited amount of metal precursor ions 40 trapped inside the second-type mesopore channel 33, the size of the metal nano-particles 52 grown there is thus less than 1 nm.

In contrast to the hindered transport in the second-type mesopore channel 33, the growth of the metal nano-particles in the first-type mesopore channel 32 in determined primarily by the conditions of precursor solutions. Consequently, the size of the metal nano-particles is larger than 2 nm.

Figure 5:
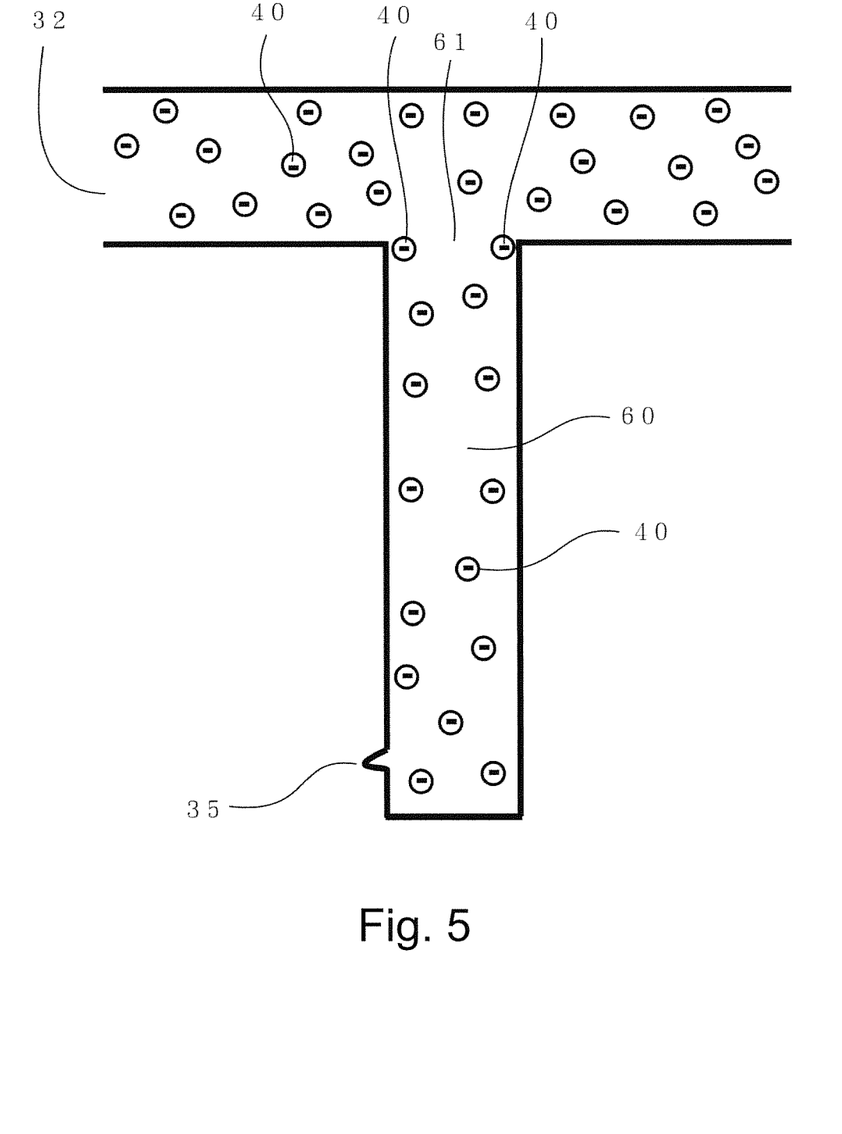
FIG. 5 shows a schematic drawing of the metal precursor ions adsorbed at the entry of a second-type mesoporous channel in the second preferred embodiment of the present invention.
Figure 6:
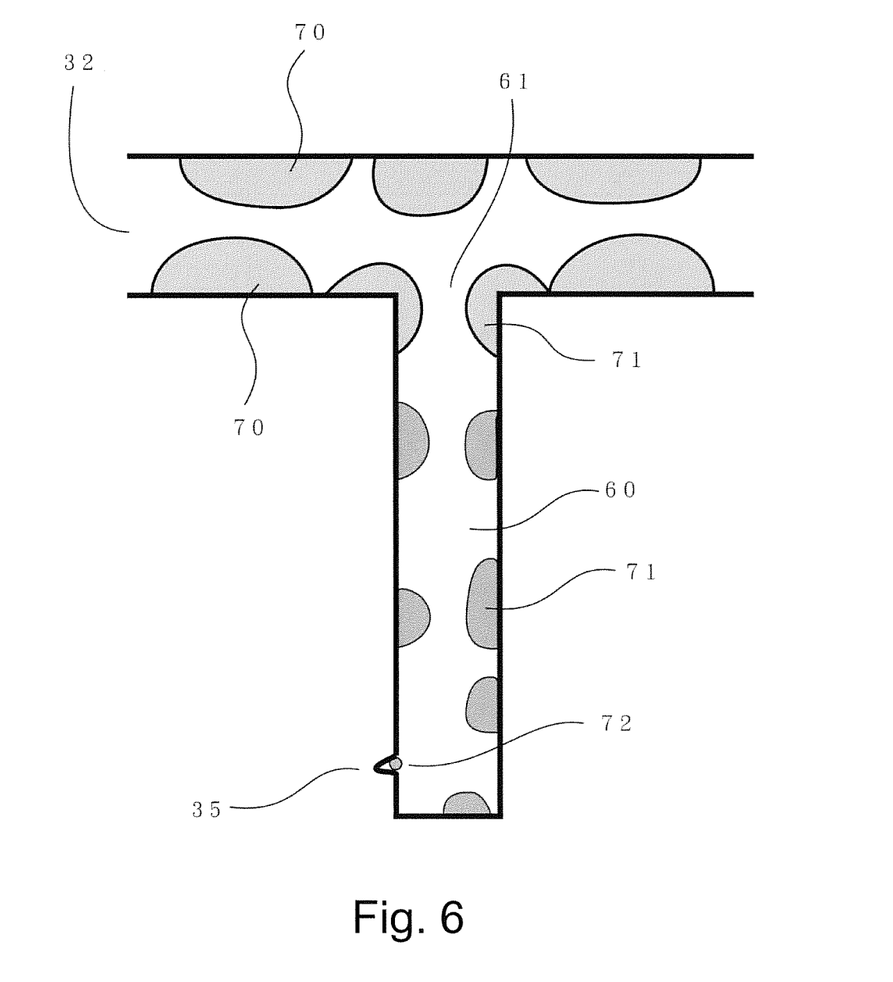
FIG. 6 shows a schematic drawing of the spatial distribution of metal nano-particles of similar sizes in the first- and third-type mesopore channels in the second preferred embodiment of the present invention.

As illustrated in FIG. 5, in comparison to the narrow entry 34 of the second-type mesopore channels 33, the entry of the third-type mesopore channel 60, has a larger diameter of ~5 nm, which is reduced to ~3 nm after adsorption of the metal precursor ions 40. As a result, the metal precursor ions 40 can easily pass through the entry 61 and reach inside the third-type mesopore channel 60. As illustrated in FIG. 6, with an unhindered supply of metal precursor ions 40, the size of metal nano-particles 71 grown inside the third-type mesopore channel 60 is mainly limited by the pore diameter, which is ~5 nm on the third-type mesopore channel 60 and ~2 nm on the micropore 35.

The difference in the sizes of metal nano-particles on the second-type 33 and third-type 60 pore channels shows that the spatial distribution of mental nano-particles in a mesopore channel depends closely on the maximum width of its entry. This can be exemplified by the two embodiments as described hereinafter.

Figure 7:
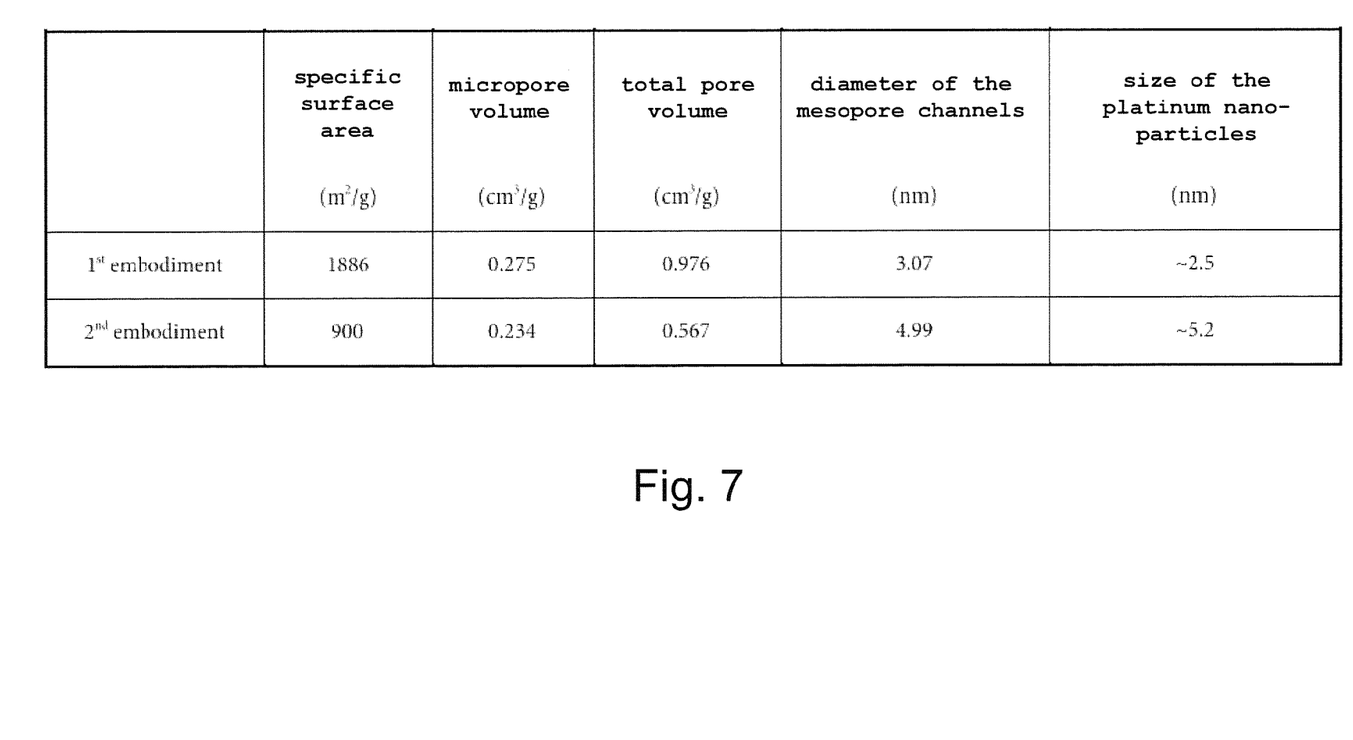
FIG. 7 shows a table showing the properties of the porous carbon materials used in the first and the second preferred embodiments measured using the 77K nitrogen adsorption method. The sizes of the platinum metal nano-particles are calculated using the X-ray diffraction method.

The method of forming the confined cell structure is described in the first preferred embodiment, while a counter example is described in the second preferred embodiment. The pore structures of the mesoporous body 30 of the first and the second preferred embodiment are shown in FIG. 7. The main difference between the pore structures of the mesoporous body 30 of the first and second preferred embodiment is their mesopore diameters, which is ~3 nm for the first embodiment and ~5 nm for the second embodiment. As mentioned above, one critical condition of forming the confined cell structure in FIG. 1 is that the maximum diameter of the entry 11 of the cavity 10 is about 3±20% nm in order to create the blockage effect. Given that the pore diameter of the mesopore channels is ~5 nm, we can therefore anticipate that the second preferred embodiment cannot form the confined structure of the present invention. Herein, the primary purpose of adopting the second preferred embodiment as an example is to verify that the maximum diameter of the entry 11 in the range of 3±20% nm is crucial for the formation of the confined cell structure of the present invention.

The First Preferred Embodiment

The mesoporous body 30 used in this preferred embodiment is a commercial porous carbon material (ECHO CHEMICAL). The pore structure measured using the 77K nitrogen adsorbing method, as illustrated in Embodiment 1 of FIG. 7, has a specific surface area of 1886 $m^2/g$, a micropore volume of 0.275 $cm^3/g$, and an total pore volume of 0.976 $cm^3/g$. The diameter of the mesopore channels is ~3.07 nm. The difference between the total pore volume and the micropore volume equals the mesopore volume, which is 0.701 $cm^3/g$ and corresponds to ~70% of the total pore volume. This means that the pore structure of the porous carbon material is mainly made of the mesopore channels with a diameter in the range of 3±20% nm.

The method of forming metal nano-particles comprises steps of placing original porous carbon materials in the solution of 8M $HNO_3$ and 2M $H_2SO_4$, followed by an oxidization treatment at the temperature ~95° C. for 40 minutes to remove impurities, and forming oxygen-containing functional groups on the surface of the porous carbon material to form anchor points for metal atoms. The oxidized porous carbon material is rinsed using deionized water and vacuum-dried for 12 hours at the temperature of 95° C. Subsequently, 1 g of the oxidized porous carbon material is mixed with 50 ml of ethylene glycol (EG) and then 0.5 ml of electrochemical metal precursor solution, prepared by mixing 265.5 mg of $H_2PtCl_6.6H_2O$ and 1 ml of EG, is slowly added with constant stirring. To adjust the reduction ability of the EG, 1 ml of 1M $NaHSO_3$ is added to reduce the quadrivalent $[PtIVCl_6]^{2-}$ to the bivalent $[PtII(SO_3)_4]^{6-}$ to form a stable platinum ion complex compound that can be evenly distributed. To adjust the growth rate of platinum nano-particles, 1 ml of 4N NaOH is added to adjust the pH value of the solution to ~4. Finally, the whole solution is placed on a heating plate at a temperature of ~120° C. for 120 minutes to reduce the platinum ion complex compound into platinum nano-particles.

Figure 8:
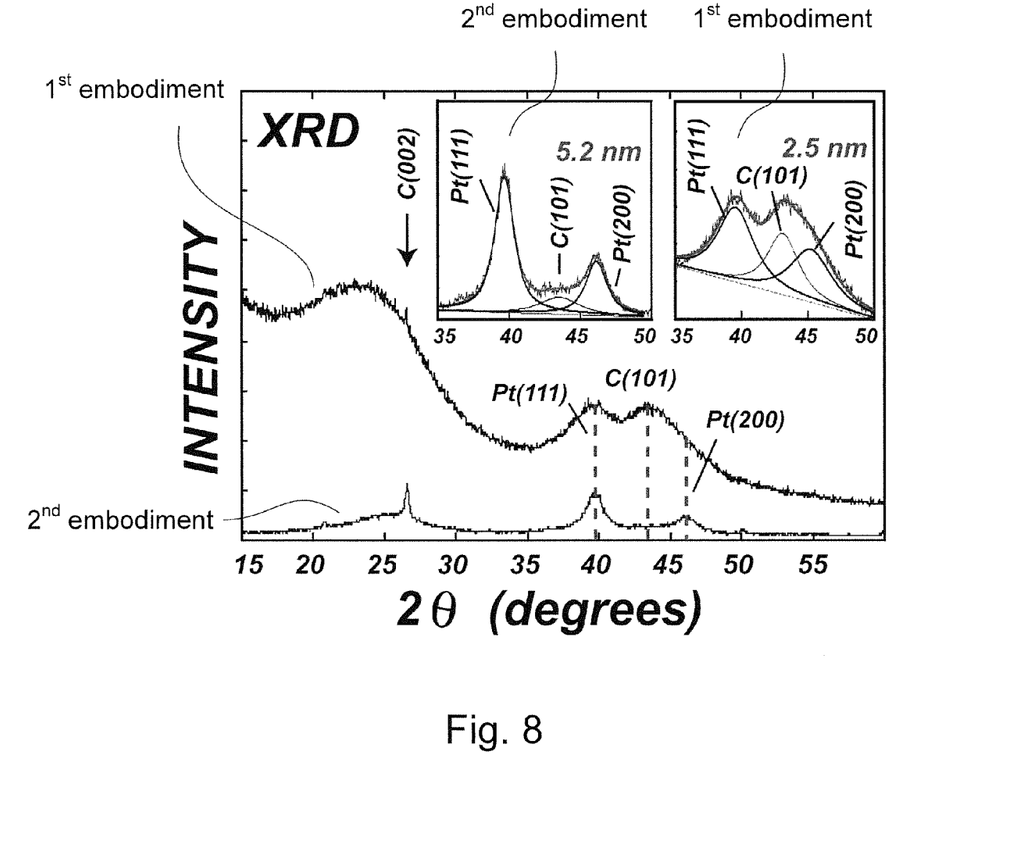
FIG. 8 shows the X-ray diffraction (XRD) spectra of the Pt decorated porous carbon materials in the first and the second preferred embodiments.
Figure 9:
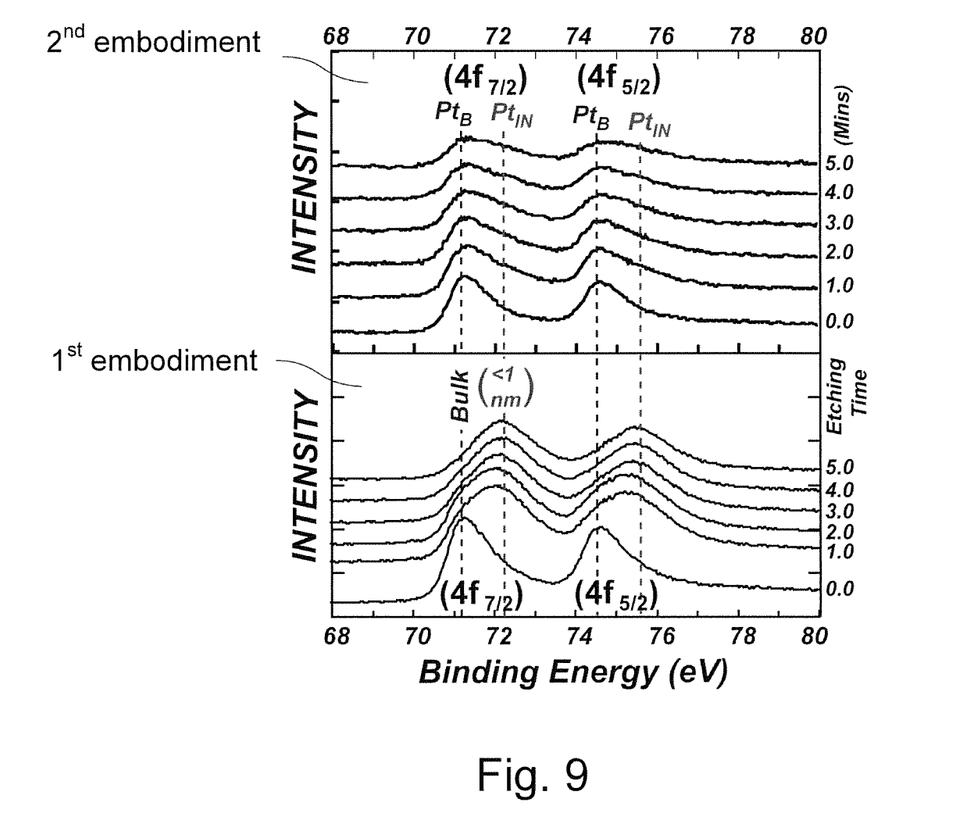
FIG. 9 shows the Pt4f spectra of the X-ray photoelectron spectroscopy (XPS) of the Pt decorated porous carbon materials in the first and the second preferred embodiments.

As shown in the Embodiment 1 of FIGS. 8 and 9 and explained in the *Carbon* 54, 389 (2013), the results of the X-ray diffraction (XRD) and the X-ray photoelectron spectroscopy (XPS) depth profiling analysis show that the platinum nano-particles in the interior region of the porous carbon material interacts strongly with the carbon material and are comprised of subnano-sized platinum particles. On the other hand, the platinum nano-particles on the surfaces of the porous carbon material has a chemical nature similar to the platinum bulk material and thus estimated to have an average size of ~3 nm.

Based on the above analysis and as shown in FIG. 4, the spatial distribution of the platinum nano-particles on the porous carbon material of this preferred embodiment has the structure of subnano-sized metal nano-particles 52 randomly distributed inside the second-type mesopore channel 33, a layer of metal nano-particles 51 with a thickness larger than 1 nm at the entry 34, and large metal nano-particles 50 with a size of ~3 nm located outside the second-type mesopore channel 33. The metal nano-particles 52 located at the entry 34 reduce the maximum width of the mesopore entry 34 to be less than 1 nm, thereby forming a confined cell structure with the entry guarded by nano-scale metal nano-particles, which help confine subnano-sized metal nano-particles inside the cell.

The Second Preferred Embodiment

The mesoporous body 30 used in this preferred embodiment is also a commercial porous carbon material (ECHO CHEMICAL). The pore structure measured using the 77K nitrogen adsorbing method, as illustrated in Embodiment 2 of FIG. 7, has a specific surface area of 900 $m^2/g$, a micropore volume of 0.234 $cm^3/g$ and a total pore volume of 0.567 $cm^3/g$. The diameter of the mesopore channel is 4.99 nm. The difference between the total pore volume and the micropore volume equals the mesopore volume, which is 0.333 $cm^3/g$ and corresponds to ~60% of the total pore volume. This means that the pore structure of the major portion of this porous carbon material is mainly made of the mesopore channels with a diameter in the range of 5±20% nm. The method of forming metal nanoparticles comprises the same steps as described in the first embodiment.

As shown in the Embodiment 2 of FIGS. 8 and 9 and explained in in the *Carbon* 54, 389 (2013), the results of the X-ray diffraction (XRD) and the X-ray photoelectron spectroscopy (XPS) depth profiling analysis show that both of the platinum nano-particles in the interior and surface regions of the porous carbon material have a chemical nature similar to the platinum bulk material and are estimated to have an average size of ~5 nm. In other words, as shown in FIG. 6, we found that the crystalline platinum nano-particles in the second embodiment are evenly distributed on the entire porous carbon material.

The difference in the spatial distribution of the metal particles in the two embodiments can be attributed to the difference in the sizes between the second-type and third-type mesopore channels. As illustrated in FIG. 3, for a diameter of ~3 nm, the maximum width of the entry 34 of the second-type mesopore channels 33 after the adsorption of a layer of metal precursor ions 41 which has a size of ~1 nm is reduced to be less than 1 nm making further passage of metal precursor ions 40, if possible, difficult. In contrast, as illustrated in FIG. 5, for a diameter of ~5 nm, the minimum width of the entry 61 of the third-type mesopore channels 60 after the adsorption of a layer of metal precursor ions 40 which has a size of ~1 nm is still larger than 3 nm giving rise to a no blockage effect for the passage of metal precursor ions 40.

The blockage at the entry 34 of the second-type mesopore channels 33 in the first preferred embodiment gives rise to hindered transport of metal precursors ions 40 such that, as illustrated in FIG. 4, the size of the metal nano-particles 52 grown inside the second-type mesopore channels 33 is thus less than 1 nm, much less than that of the metal nano-particles 50 outside. Without the blockage, the size of metal nano-particles 71 grown inside the third-type mesopore channels 60 is greater than 2 nm, similar to that of the metal nano-particles 70 outside, as illustrated in FIG. 6.

To sum up, the present invention discloses a confined cell structure with the entries guarded by nano-scale metal nano-particles to help confine subnano-sized metal nano-particles inside the cell. For catalytic metal nano-particles, the confinement increases the chance of collisions between the energetic reaction products and the highly active subnano-sized metal particles to form a more stable product that are otherwise inaccessible in other catalytic reactions in an open system. Also, this confined structure can be used as an energy storage device to store the reaction products with a size larger than the maximum width of the guarded cell entries. Also the present invention provides a method of forming said confined cell structure on mesoporous carbon materials using a simple impregnation process. The process is simple and has merits of saving cost.

Although this invention has been disclosed and illustrated with reference to particular embodiments, the principles involved are susceptible for use in numerous other embodiments that will be apparent to persons skilled in the art. Therefore, this invention is to be limited only as indicated by the scope of the appended claims.

What is claimed is:
1. A confined cell structure comprising:
   a porous cavity with a plurality of cavity entries;
   a plurality of metal nano-particles formed at all of said cavity entries to reduce a maximum width of said cavity entries to be less than 1 nm; and
   a plurality of subnano-sized metal nano-particles formed inside said porous cavity.
2. The confined cell structure as claimed in claim 1, wherein the maximum diameter of said cavity entries is 3±20% nm.

3. The confined cell structure as claimed in claim 1, wherein at least one of said cavity entries has a diameter of 3±20% nm.

4. The confined cell structure as claimed in claim 1, wherein the thickness of said plurality of metal nano-particles is larger than 1 nm.

5. The confined cell structure as claimed in claim 1, wherein the size of said subnano-sized metal nano-particles is smaller than 1 nm.

6. A method of forming a confined cell structure comprising:
　preparing a mesoporous body consisting of a plurality of macropores, each macropore communicates with a plurality of first-type mesoporous channels, and each of the first-type mesoporous channels communicates with a plurality of second-type mesopore channels;
　oxidizing the mesoporous body to form a plurality of oxygen-containing functional groups on the surfaces of the first-type mesopore channels and the second-type mesopore channels;
　distributing a plurality of metal precursor ions in the first-type mesopore channel via an impregnation method to form a layer of metal precursor ions at the entries of the second-type mesopore channels to reduce the maximum width of the entries to be less than 1 nm; and
　reducing the distributed metal precursor ions to form a plurality of metal nano-particles with a size in the range of 2-5 nm in the first-type mesopore channel, a layer of metal nano-particles with a thickness of larger than 1 nm at the entries of the second-type mesopore channels and a plurality of subnano-sized metal nano-particles with the maximum size no larger than 1 nm inside the second-type mesopore channel.

7. The method as claimed in claim 6, wherein said mesoporous body is made of porous carbon materials, zeolites, or porous silicates.

8. The method as claimed in claim 6, wherein the minimum diameter of said macropores is 50 nm, the minimum diameter of said first-type mesopore channels is 20 nm, and the maximum diameter of said second-type mesopore channel is 3±20% nm.

9. The method as claimed in claim 6, wherein a total mesopore volume of said mesoporous body is 70% of a total pore volume.

10. The method as claimed in claim 6, wherein the size of said metal precursor ions is 1±30% nm.

\* \* \* \* \*